United States Patent [19]

Newnes

[11] 4,281,953
[45] Aug. 4, 1981

[54] VERTICAL SORT BIN

[76] Inventor: W. R. Newnes, 2621 4 Ave. NE., (P.O. Box 8), Salmon Arm, British Columbia, Canada

[21] Appl. No.: 886,305

[22] Filed: Mar. 13, 1978

[51] Int. Cl.³ .............................................. B65G 57/03
[52] U.S. Cl. .................................... 414/268; 209/933; 209/521; 414/49; 414/564
[58] Field of Search ............... 209/517, 518, 519, 520, 209/521, DIG. 933; 214/6 S, 6 H, 6 R, 16 B; 198/436, 447, 451; 414/28, 35, 45, 48, 49, 609, 268, 564

[56] References Cited

U.S. PATENT DOCUMENTS

| 2,998,133 | 8/1961 | Rambo | 214/6 H X |
| 3,085,686 | 4/1963 | Hanbury | 209/933 X |
| 3,653,506 | 4/1972 | Turner et al. | 209/518 |
| 3,700,120 | 10/1972 | Romick et al. | 214/6 H X |
| 3,913,744 | 10/1975 | Turner et al. | 214/6 H X |

Primary Examiner—Frank E. Werner
Attorney, Agent, or Firm—Lawrence I. Field

[57] ABSTRACT

A sort bin having substantially vertical bin walls and a vertically movable bin floor, the floor being mounted such that it is in a predetermined and fixed inclined attitude throughout its vertical movement.

4 Claims, 5 Drawing Figures

VERTICAL SORT BIN

BACKGROUND OF THE INVENTION

This invention relates to a vertical sort bin for use in a lumber mill, and into which cut lumber is collected.

There are different types of known sort bins some of which have inclined walls and all of which have a substantially horizontal bin floor which is either secured in a horizontal disposition for vertical movement between the bin walls or is pivotally mounted such that is can be held substantially horizontal throughout movement between the bin walls and can be released to an inclined position for dumping lumber from the bottom of the bin.

SUMMARY OF THE INVENTION

The sort bin of this invention is provided with vertical or near vertical bin walls and has an inclined bin floor which is not pivotal but is rigidly secured to a support which is movable along most of the vertical length of the bin walls.

With such a structure, the inclined bin floor can be raised very close to a conventional bar sorter passing overhead thus minimizing the distance that the boards drop from the sorter to the bin floor and hence reducing damage of the lumber by bruising. The first few boards which drop into the bin land upon the inclined bin floor and slide to the lowest part of the floor against the adjacent bin wall thus squaring the boards and so achieving a more manageable filling of the sort bin than is possible with a horizontal floor bin. As the bin walls are vertical, the discharge of lumber is positive in that there is no possibility of lumber being held in the bin such as can sometimes occur with a sort bin having inclined walls. There is also no necessity for any exposed operating mechanism or securing attachments to the bin floor or bin walls which again increases the dependability of the discharge. Finally, the construction of a vertical or almost vertical bin with an inclined floor is very much simpler than the construction of a bin having sloping walls and a pivoted floor and hence there is a great reduction in the costs involved in manufacturing the sort bin of this invention over the conventional bins.

BRIEF DESCRIPTION OF THE DRAWINGS

The sort bin will now be described with reference to the accompanying drawings in which.

DETAILED DESCRIPTION OF PREFERRED EMBODIMENTS

Figure 1:
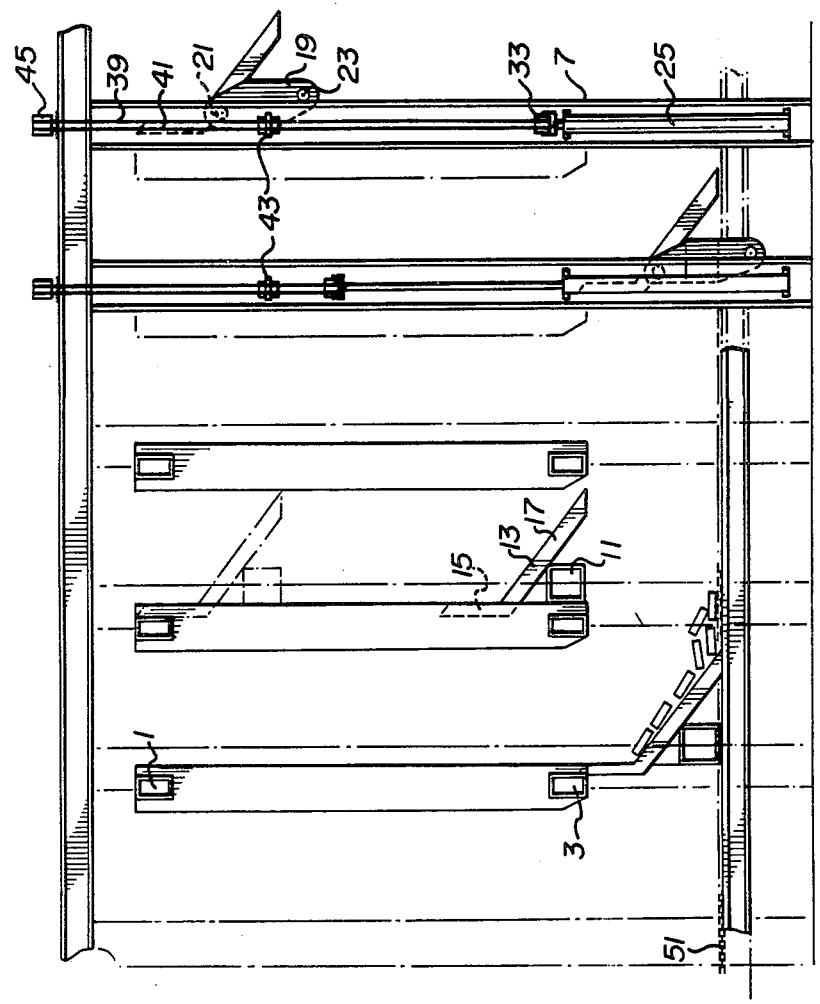
FIG. 1 is a schematic front elevational view of sort bins of this invention shown installed over a discharge chain conveyor.
Figure 2:
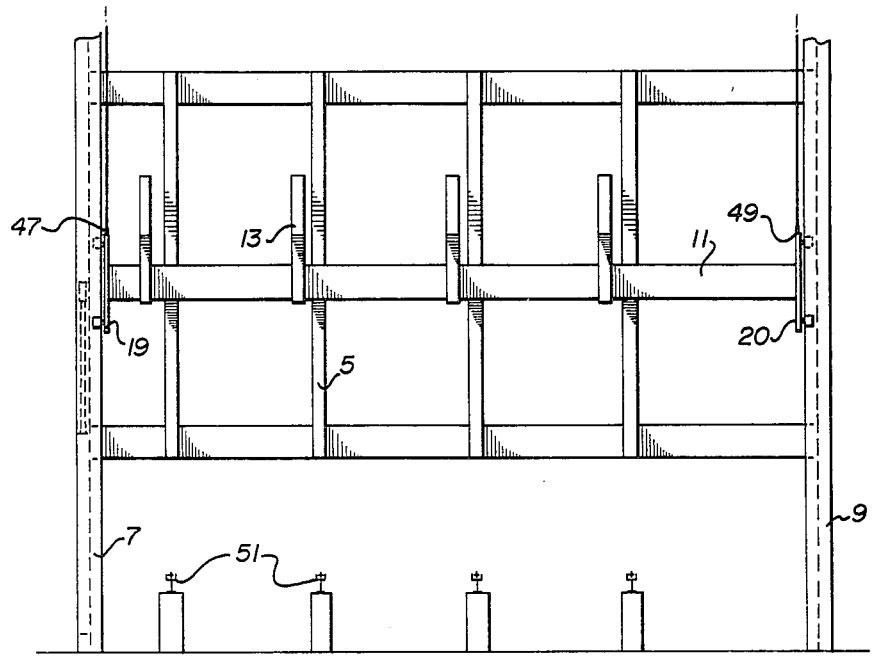
FIG. 2 is a schematic end elevational view of one side of one of the sort bins of FIG. 1 showing the inclined floor.
Figure 3:
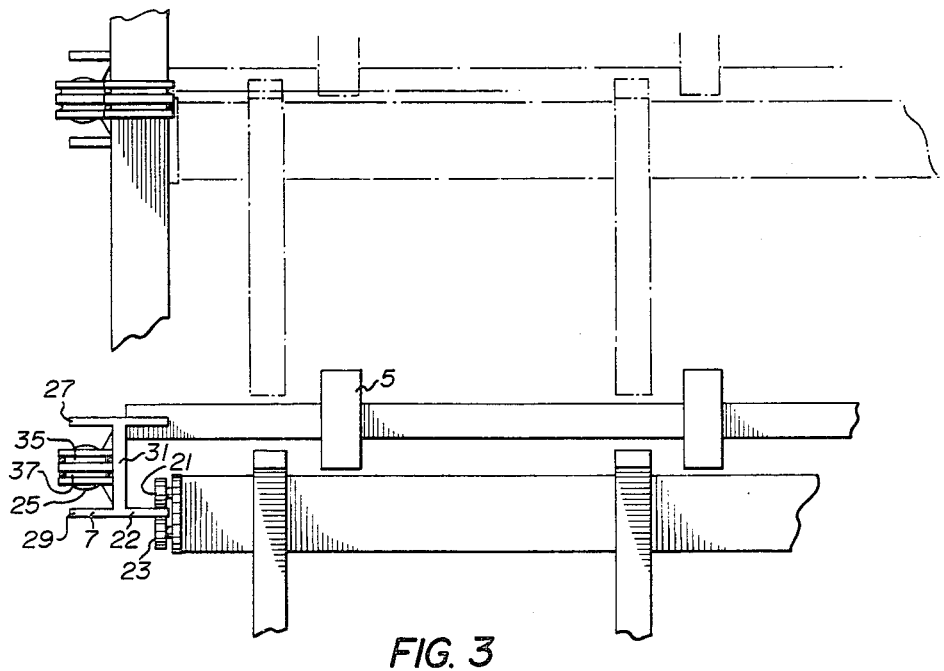
FIG. 3 is a schematic fragmentary plan view showing part of the floor securing and guiding structure.

Referring to the drawings, the sort bins are constructed with common walls between adjacent bins, each wall having an upper horizontal box girder 1, a lower horizontal box girder 3, and a number of vertical girder members 5. The bin walls are supported between vertical columns 7 and 9. The columns and bin walls can be fabricated either by welding, riveting, or bolting, or a combination of any of these.

Each bin floor consists of a horizontal box girder 11 upon which are secured, by welding and brackets (not shown), a number of box members 13 which are spaced apart along the beam 11 at a distance adequate to support the lumber without letting any fall between them. Each box member 13 is formed with a vertical leg 15 and an inclined leg 17.

At each end of beam 11 there is attached a carriage in the form of a flat plate 19, 20 by welding or the like, each plate having an upper roller 21 and a lower roller 23 which respectively are behind and in front of the inner front flanges 22 of columns 7. Therefore, the plates 19 and hence the bin floors are movable vertically along the columns 7.

In order to control the movement of the bin floors, any type of suitable hydraulic, compressed air, or electric mechanism can be utilized, one type being shown in the drawings for illustrative purposes. In the operating mechanism shown, a hydraulic or compressed air cylinder 25 is mounted outside the web 31 of column 7 and between the outer flanges 27 and 29. The mounting of cylinder 25 can be through mounting lugs on the ends of the cylinder which can be secured by bolts (not shown) to web 31. The piston rod is provided with a pulley 33 having twin grooves 35 and 37, and two cables 39 and 41 are secured to an attachment 43 on column 7, pass around pulley 33, pass over a double groove pulley 45 secured above the head of column 7, one cable then passing down the inside of column 7 to be secured to plate 19 at 47, while the other cable passes above the top of the bin wall, over a pulley (not shown) above column 9 and then passes down the inside of column 9 to be secured to plate 20 at 49.

The operation of the sort bins will be controlled by an operator and limit switches in a well known manner, the controlling of the sort bins not forming part of this invention.

During operation, the sort bins are loaded with lumber from a sorter which will be conventionally located above the bins. As the bins are being filled, the bin floor will be lowered and when required, the bin floor can be lowered below the bottom edge of the bin walls such that lumber can spill onto unloading chains 51 for removal of or continued processing or storage. Due to the incline of the bin floor, lumber being fed from the bottom of the bin does not have to drop a great distance onto the chains 51, and the speed of emptying of the bin can be controlled by controlling the speed of chains 51. After the emptying of a bin, the sloping floor is raised to its highest position by the raising mechanism, and filling of the bin will continue.

Figure 4:
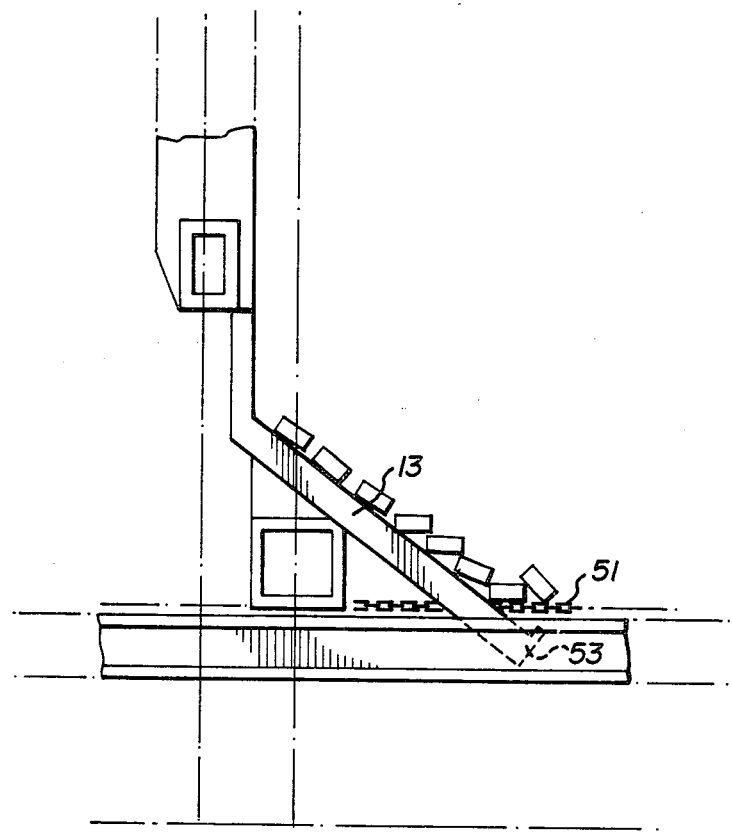
FIG. 4 is a view of the lower end of another embodiment of bin floor.

In an embodiment of the apparatus as shown in FIG. 4, a short projecting dog 53 is secured to the lower end of arms 13 of the bin floor, this dog effectively holding back the lumber for a longer time when the bin floor is lowered below the bin sides. This prevents the lumber from spilling too quickly onto the chains 51. However in this modification, the lower end of the bin floor will have to pass below the chains so that the lumber will be carried above the dogs by the chains 51.

Figure 5:
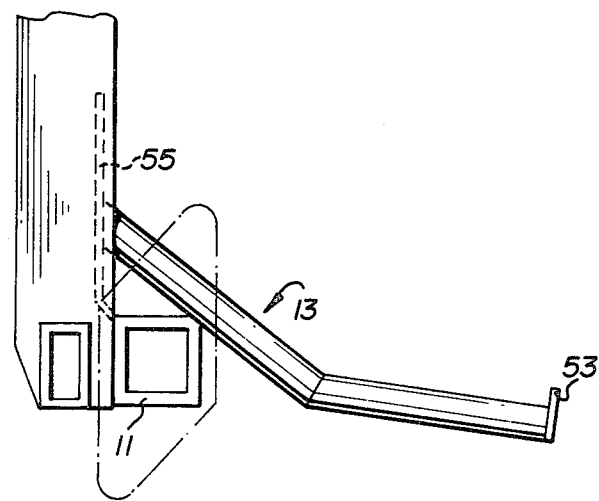
FIG. 5 is a view of the lower end of the third embodiment of bin floor.

In a further embodiment of the apparatus as shown in FIG. 5, the arms 13 of the bin floor are angled as shown as well as having a projecting dog 53. It is also preferable to use a square tube for the arms to achieve the required strength and lightness for ease of operation. The arms are secured by welding or the like, to a narrow flat plate 55 which, together with the plate 55 are welded to beam 11. The carriage for supporting and guiding beam 11 is of similar form to that shown in FIG. 1 except that it is constructed and fitted with rollers such that it can operate between two side flanges of the respective columns.

The embodiments of the invention in which an exclusive property or privilege is claimed are defined as follows:

1. A sort bin having substantially vertical bin walls and a vertically movable bin floor, the floor being mounted such that it is in a predetermined and fixed inclined attitude throughout its vertical movement, said sort bin comprising:
    a pair of spaced apart, facing, substantially vertical bin walls supported at their ends between vertical columns of an I-beam configuration;
    a downwardly inclined bin floor extending between said bin walls, said bin floor consisting of a plurality of downwardly inclined arms and a horizontal beam, each arm being secured to said horizontal beam; and
    a carriage having an upper roller and a lower roller rigidly secured to its upper end and its lower end respectively, the carriage being supported from and guided between the columns of one bin wall, each carriage being disposed with its upper roller running against the inner surface of on flange of said vertical column and its lower roller running against the outer surface of said flange to be vertically movable therealong so that said bin floor can vertically move between a raised position adjacent to the upper ends of said bin walls and a lower-most position at the region of an unloading conveyor with the bin floor being maintained at all times during operation in its downwardly inclined attitude whereby as the bin is filled with cut lumber, the bin floor lowers until the bin is full, whereafter further lowering of the bin floor permits the cut lumber to slide down the bin floor and below the bin walls, at which time the cut lumber discharges onto said unloading conveyor.

2. The bin of claim 1, wherein each arm is angled at its central region and has a rigidly secured dog extending upwardly at its lower end.

3. A sort bin comprising a pair of spaced apart, facing, substantially vertical bin walls, each consisting of two horizontal girders and a plurality of vertical girders secured thereto to form a framework, the framework being rigidly supported at its end between vertical columns of an I-beam configuration;
    an inclined bin floor extending between said bin walls, the floor consisting of a plurality of arms and a horizontal beam each arm being rigidly secured to and extending from said horizontal beam;
    a carriage having an upper and lower roller rigidly secured to each end of the horizontal beam, the beam being supported from, and guided between, the columns of one bin wall through the carriages which each have the upper roller running against the inner surface of one flange of the column, and the lower roller running against the outer surface of said flange to be vertically movable therealong so that said bin floor can vertically move between a raised position adjacent to the upper ends of said bin walls and a lower-most position at the region of an unloading conveyor with the bin floor being maintained at all times during operation in its inclined attitude such that as the bin is filled with cut lumber, the bin floor lowers until the bin is full, whereafter further lowering of the bin floor permits the cut lumber to slide down the bin floor and below the bin walls, at which time the cut lumber discharges onto the unloading conveyor.

4. The bin of claim 3 wherein each arm is angled at its central region and has a rigidly secured dog extending upwardly at its lower end.

* * * * *